(12) United States Patent
Xu et al.

(10) Patent No.: US 10,853,202 B2
(45) Date of Patent: Dec. 1, 2020

(54) METHOD, DEVICE AND COMPUTER READABLE MEDIUM FOR DATA SYNCHRONIZATION

(71) Applicant: EMC IP Holding Company LLC, Hopkinton, MA (US)

(72) Inventors: Hongru Xu, Shanghai (CN); Fei Long, Shanghai (CN); Tianfang Xiong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 16/222,072

(22) Filed: Dec. 17, 2018

(65) Prior Publication Data

US 2019/0324869 A1    Oct. 24, 2019

(30) Foreign Application Priority Data

Apr. 20, 2018    (CN) .......................... 2018 1 0362628

(51) Int. Cl.
| | |
|---|---|
| *G06F 11/00* | (2006.01) |
| *G06F 11/16* | (2006.01) |
| *G06F 11/20* | (2006.01) |
| *H04L 29/14* | (2006.01) |
| *H04L 29/08* | (2006.01) |

(52) U.S. Cl.
CPC ...... *G06F 11/1662* (2013.01); *G06F 11/2082* (2013.01); *G06F 11/2094* (2013.01); *H04L 67/1095* (2013.01); *H04L 69/40* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,155,635 B1 * | 12/2006 | Phelps | ............... G06F 11/2082 |
| | | | 714/6.31 |
| 7,606,868 B1 * | 10/2009 | Le | .......................... G06F 16/10 |
| | | | 709/211 |
| 8,954,673 B1 | 2/2015 | Natanzon et al. | |
| 9,514,089 B1 | 12/2016 | Raj et al. | |
| 10,120,925 B1 | 11/2018 | Natanzon et al. | |
| 10,235,091 B1 | 3/2019 | Ayzenberg et al. | |

(Continued)

*Primary Examiner* — David Yi
*Assistant Examiner* — Craig S Goldschmidt
(74) *Attorney, Agent, or Firm* — BainwoodHuang

(57) ABSTRACT

Techniques perform data synchronization. The techniques involve: in response to writing of data to a source storage array, determining whether a transmission link between the source storage array and a destination storage array is disconnected, the data being to be synchronized to the destination storage array; in response to determining that the transmission link is disconnected, accumulating in the source storage array the data written to the source storage array; in response to detecting that the transmission link is recovered, creating a snapshot for a storage unit associated with the data in the destination storage array; and in response to crashing of the source storage array during resynchronization of the data accumulated in the source storage array to the storage unit, restoring the storage unit in the destination storage array using the snapshot. Therefore, the storage space for the snapshot is greatly saved while disaster recovery is ensured.

11 Claims, 5 Drawing Sheets

(56) References Cited

U.S. PATENT DOCUMENTS 10,395,485 B2     8/2019   Susaki et al.
2012/0317353 A1*   12/2012   Webman ................. G06F 3/065
                                                               711/108

* cited by examiner

METHOD, DEVICE AND COMPUTER READABLE MEDIUM FOR DATA SYNCHRONIZATION

FIELD

Embodiments of the present disclosure generally relate to the field of computer, and more specifically relate to a method, device and computer readable storage medium for data synchronization.

BACKGROUND

Synchronous replication is typically applied to disaster recovery. During the synchronous replication, each write on a source storage array is replicated synchronously to a destination storage array via a transmission link between the source storage array and the destination storage array, where a recovery point object (RPO) is 0. Force failover is performed when the source storage array crashes, to provide service using the destination storage array.

In some abnormal cases, the transmission link may be undesirably disconnected. Under this circumstance, the data written on the source storage array cannot be synchronized to the destination storage array, but are only written or accumulated at the source storage array side. When the transmission link is recovered, the data accumulated at the source storage array side are resynchronized to the destination storage array. However, some mistakes may still occur during the resynchronization course, resulting in unavailability of the entire file system.

SUMMARY

According to example embodiments of the present disclosure, there is provided an improved solution for data synchronization.

In a first aspect of embodiments of the present disclosure, there is provided a method for data synchronization. The method includes: in response to writing of data to a source storage array, determining whether a transmission link between the source storage array and a destination storage array is disconnected, the data being to be synchronized to the destination storage array; in response to determining that the transmission link is disconnected, accumulating in the source storage array the data written to the source storage array; in response to detecting that the transmission link is recovered, creating a snapshot for a storage unit associated with the data in the destination storage array; and in response to crashing of the source storage array during resynchronization of the data accumulated in the source storage array are being resynchronized to the storage unit, restoring the storage unit in the destination storage array using the snapshot.

In a second aspect of embodiments of the present disclosure, there is provided an electronic device. The electronic device includes: a processing unit; and a memory storing instructions which, when executed by the processing unit, cause the electronic device to: in response to writing of data to a source storage array, determine whether a transmission link between the source storage array and a destination storage array is disconnected, the data being to be synchronized to the destination storage array; in response to determining that the transmission link is disconnected, accumulate in the source storage array the data written to the source storage array; in response to detecting that the transmission link is recovered, create a snapshot for a storage unit associated with the data in the destination storage array; and in response to crashing of the source storage array during resynchronization of the data accumulated in the source storage array are being resynchronized to the storage unit, restore the storage unit in the destination storage array using the snapshot.

In a third aspect of embodiments of the present disclosure, there is provided a computer readable medium. The computer readable medium has a computer program stored thereon which, when executed by a processor, implements the method in accordance with the first aspect of the present disclosure.

It would be appreciated that this Summary is not intended to identify key features or essential features of embodiments of the present disclosure, nor is it intended to be used to limit the scope of the present disclosure. Other features of the present disclosure will be made clearer through the following description.

BRIEF DESCRIPTION OF THE DRAWINGS

The above and other objectives, features and advantages of example embodiments of the present disclosure will become more apparent, through the detailed description on example embodiments of the present disclosure with reference to the accompanying drawings. Throughout the drawings, the same or similar reference symbols refer to the same or similar elements, in which.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail with reference to the drawings. Although the drawings illustrate some embodiments of the present disclosure, it would be appreciated that the present disclosure may be implemented in various manners but cannot be limited by the embodiments as described herein, and rather, these embodiments are provided to disclose the present disclosure more thoroughly and completely. It would be appreciated that drawings and embodiments of the present disclosure are only provided as examples, without any intention to limit the protection scope of the present disclosure.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." Other definitions, either explicit or implicit, may be included below.

Figure 1:
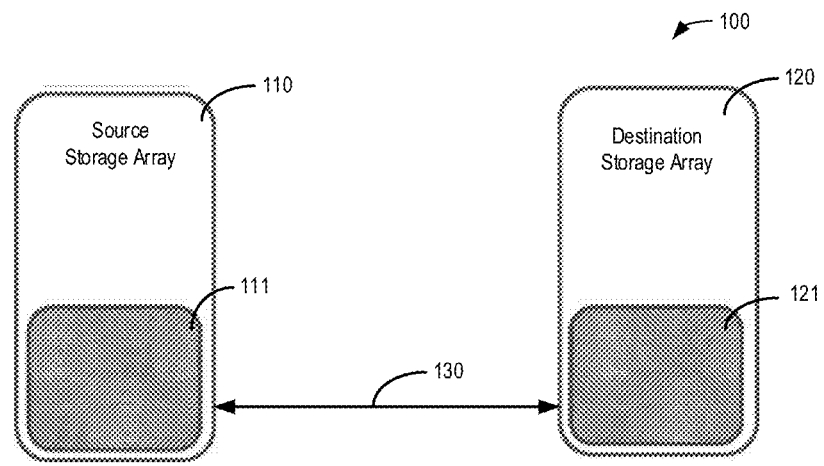
FIG. 1 illustrates a diagram of synchronous replication in which embodiments of the present disclosure can be implemented.

FIG. 1 illustrates a diagram 100 of synchronous replication in which embodiments of the present disclosure can be implemented. As shown in FIG. 1, for a source storage array 110, synchronous protection for it can be implemented by synchronizing each write thereon to a destination storage array 120. For example, when a synchronous replication mechanism is enabled, a transmission link 130 is created between the source storage array 110 and the destination storage array 120. In the description on the embodiments of the present disclosure, the term "storage array" can refer to a disk array or similar storage resource array. According to embodiments of the present disclosure, the transmission link 130, such as a control channel and a data channel, can be built between the source storage array 110 and the destination storage array 120 by means of Transmission Control Protocol/Internet Protocol (TCP/IP). According to embodiments of the present disclosure, the transmission link 130 can be implemented by means of a fiber channel or Internet Small Computer System Interface (iSCSI), for example. It should be appreciated that the present application does not make any limitation in this aspect.

According to embodiments of the present disclosure, the synchronous replication can be implemented through a technology such as MirrorView or the like. For example, a write for a storage unit 111 of the source storage array 110 is synchronized via the transmission link 130 to a storage unit 121 of the destination storage array 120, where a RPO is set to 0. It should be appreciated that the embodiments of the present disclosure are applicable to various synchronous replication technologies, but not limited to those listed herein.

Figure 2:
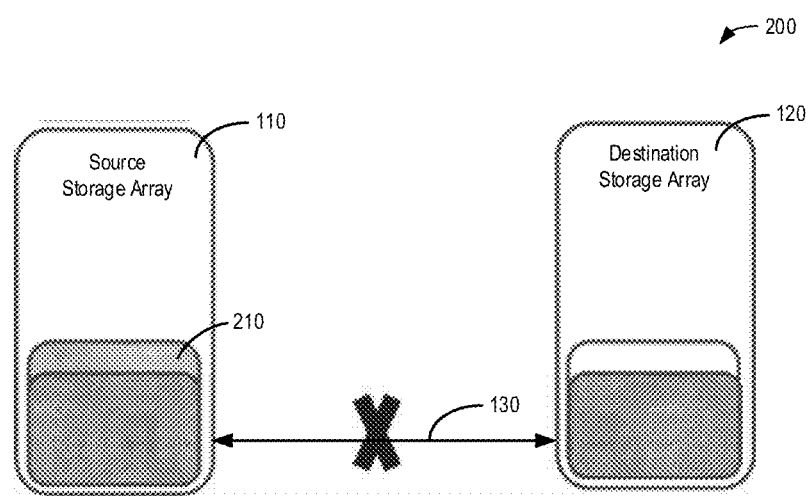
FIG. 2 illustrates a diagram of data accumulation at a source storage array in which embodiments of the present disclosure can be implemented.

FIG. 2 illustrates a diagram 200 of data accumulation at a source storage array in which embodiments of the present disclosure can be implemented. As described above, in some abnormal cases, the transmission link 130 may be undesirably disconnected. Under this circumstance, the write on the storage unit 111 of the source storage array 110 cannot be synchronized to the storage unit 121 of the destination storage array 120, and is only written or accumulated at the source storage array 110, the accumulated data being shown by 210 in FIG. 2.

Figure 3:
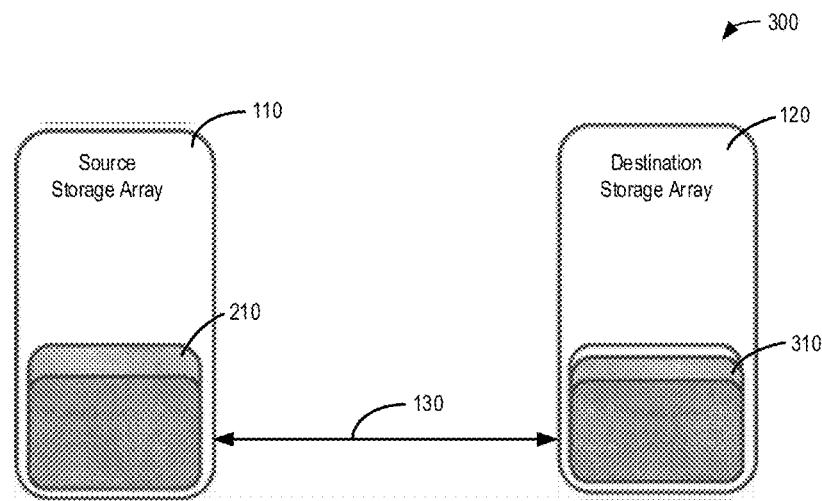
FIG. 3 illustrates a diagram of resynchronization in which embodiments of the present disclosure can be implemented.

FIG. 3 illustrates a diagram 300 of resynchronization in which embodiments of the present disclosure can be implemented. As shown in FIG. 3, when the transmission link 130 is recovered, the data 210 accumulated at the source storage array 110 are resynchronized to the destination storage array 120, the resynchronized data being shown by 310 in FIG. 3.

Figure 4:
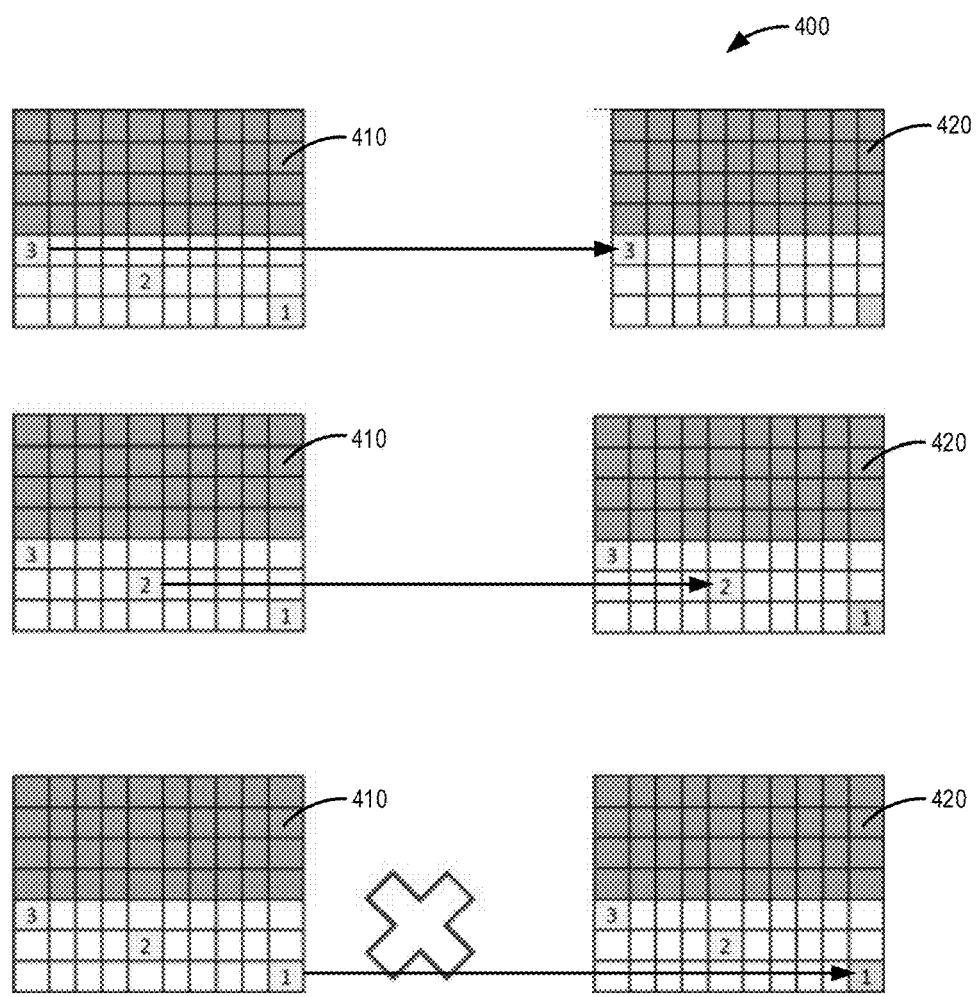
FIG. 4 illustrates a diagram of data block synchronization in a circumstance that a source storage array crashes during resynchronization.

Problems possibly occurring during the resynchronization will be described below with reference to FIG. 4. FIG. 4 illustrates a diagram 400 of data block synchronization in a circumstance that the source storage array crashes during the resynchronization. The preceding example is still employed herein, and a source data block (grey area) 410 (for example, the storage unit 111 of the source storage array 110 as shown in FIG. 1) has been synchronized to a destination storage array (for example, the storage unit 121 of the source storage array 120 as shown in FIG. 1) as shown by the data block (grey area) 420. When the transmission link (for example, the transmission link 130 as shown in FIG. 1) is disconnected, data blocks 1, 2 and 3 are accumulated sequentially at the source storage array 110.

When the transmission link is recovered, the accumulated data blocks are replicated one by one to respective storage locations of the destination storage array 120 according to a sorting order of data blocks, rather than the writing order of the data blocks. For example, as shown in the upper part of FIG. 4, the data block 3 is first synchronized to a respective storage location of the destination storage array 120. Then, as shown in the middle part of FIG. 4, the data block 2 is synchronized to a respective storage location of the destination storage array 120. As shown in the lower part of FIG. 4, the data block 1 is subsequently synchronized to a respective storage location of the destination storage array 120.

However, for example, the source storage array 110 crashes during the synchronization for the data block 1 (as shown in the lower part of FIG. 4), and at this time, the data block 1 has not been synchronized to the respective storage location of the destination storage array 120. For example, assuming the data blocks 1, 2 and 3 are metadata of the file system, they are typically used sequentially, and thus if the data block 1 is not synchronized to the destination storage array 120, the data blocks 2 and 3 having been synchronized are still unable to be used. This is considered as that the file system is damaged, rendering the entire file system at the destination storage array 120 unavailable, i.e., being unable to implement disaster recovery for the source storage array 110.

In the existing solution, it has been proposed to obtain periodically a snapshot of a storage unit of a destination storage array, and to select the recent snapshot when a disaster occurs, to restore the storage unit of the of the destination storage array. In the solution, even though the system runs normally, there remains an extra storage space for storing the snapshot all the time. In addition, if the selected snapshot is just created during a resynchronization, the disaster recovery still cannot be implemented.

In light of this, one aspect of the basic concept of the embodiments of the present disclosure lies in creating a snapshot if needed. The other aspect is to delete the snapshot if not needed. In this way, the storage space is greatly saved while the disaster recovery is ensured. More details will be provided below with reference to FIGS. 5 and 8.

Figure 5:
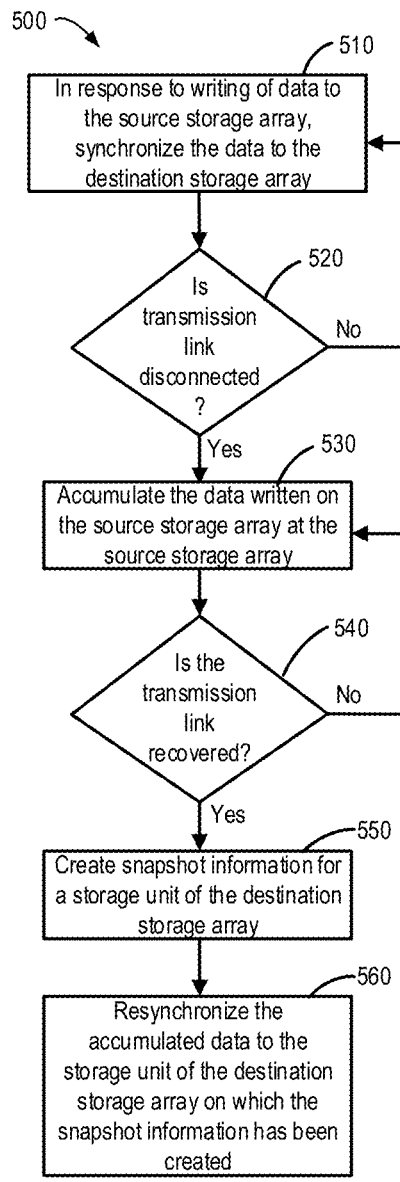
FIG. 5 illustrates a flowchart of a data synchronization method according to embodiments of the present disclosure.

FIG. 5 illustrates a flowchart of a method 500 for data synchronization according to embodiments of the present disclosure. The method 500 can be implemented at a server, controller, client or terminal device for controlling a storage device or storage system. The storage device or storage system includes a source storage array (for example, the source storage array 110 as shown in FIGS. 1-3) and a destination storage array (for example, the destination storage array 120 as shown in FIGS. 1-3) for synchronous replication.

As shown in FIG. 5, at block 510, in response to a write of data on the source storage array, the data are synchronized to the designation storage array. According to embodiments of the present disclosure, for each input/output (I/O) write on the source storage array, the written data are synchronized to the destination storage array, where a RPO is set to 0. According to the embodiments of the present disclosure, in response to a synchronous replication function being enabled, a transmission link (for example, the transmission link 130 as shown in FIGS. 1-3) between the source storage array and the destination storage array is created, and the data written to the source storage array is synchronized to the storage unit of the destination storage array via the created transmission link. The procedure at block 510 is similar to the procedure as described above with reference to FIG. 1, which is omitted herein.

At block 520, it is determined (or ascertained) whether the transmission link is disconnected. If the transmission link is not disconnected, it returns to block 510 to continue to perform the synchronous replication. If the transmission link is disconnected, it proceeds to block 530. At block 530, the data written onto the source storage array are only written or accumulated at the source storage array, and cannot be synchronized to the destination storage array. The procedure at block 530 is similar to the procedure as described with reference to FIG. 2, which is omitted herein.

At block 540, it is determined whether the transmission link is recovered. If the transmission link is not recovered, it returns to block 530 to continue to accumulate data on the source storage array. If the transmission link is recovered, it proceeds to block 550.

At block 550, a snapshot is created for the storage unit of the destination storage array. As mentioned above, the inventor have noticed that, since the accumulated data block 1 is not resynchronized to the destination storage array, the resynchronized data blocks 2 and 3 are still unable to be used, and the file system thus is considered as damaged, rendering the entire file system unusable. Hence, the inventor envisions that, these partly synchronized data (for example, data blocks 2 and 3) may not be considered but only the previously available data (for example, the set of data blocks as shown by 420 in FIG. 4) are taken into account during creation of the snapshot, so that the file system is at least partly available when a disaster occurs, thereby ensuring the disaster recovery and improving user experience.

According to the embodiments of the present disclosure, in response to recovery of the transmission link, for example, just prior to performing resynchronization for the data accumulated on the source storage array, a snapshot can be created for the respective storage unit of the destination storage array. According to the embodiments of the present disclosure, the storage unit is associated with the accumulated data. In one embodiment, the storage unit can correspond to a particular storage object, such as a file system and the like. In a further embodiment, the storage unit can correspond to a particular logic unit number (LUN), such as a logic storage unit allocated to the related data in advance. According to the embodiments of the present disclosure, the creating of the snapshot can be implemented by any appropriate technology existing or to be developed in the future, which is not limited in the present disclosure in any manner.

Figure 6:
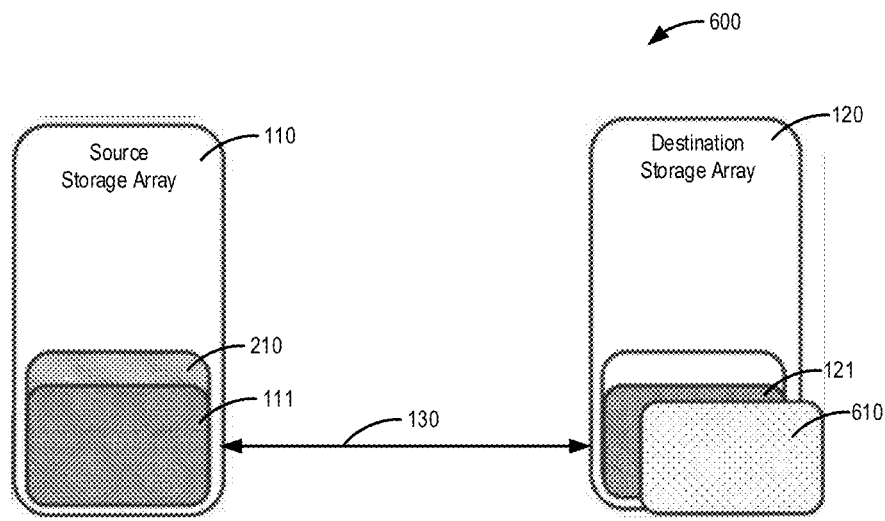
FIG. 6 illustrates a diagram of creating a snapshot according to embodiments of the present disclosure.

More details will be provided below with reference to FIG. 6. FIG. 6 illustrates a diagram 600 of obtaining a snapshot according to embodiments of the present disclosure. As shown in FIG. 6, prior to resynchronizing the data 210 accumulated on the source storage array 110 to the destination storage array 120, a snapshot 610 is created for the storage unit 120 on the destination storage array 120. The storage unit 121 corresponds to the data synchronized previously from the storage unit 111 of the storage array 110. As such, a snapshot is created for the respective storage unit of the destination storage array only if necessary, for example, when the transmission link is recovered after being disconnected, such as just prior to resynchronizing the data accumulated on the source storage array. As compared with periodically creating a snapshot in the existing solution, it can ensure the disaster recovery and save the storage space remarkably.

After the snapshot is created at block 550, the data accumulated on the source storage array are synchronized to the storage unit of the destination storage array. The procedure at block 560 is similar to the procedure as described above with reference to FIG. 3, which is omitted herein.

Figure 7:
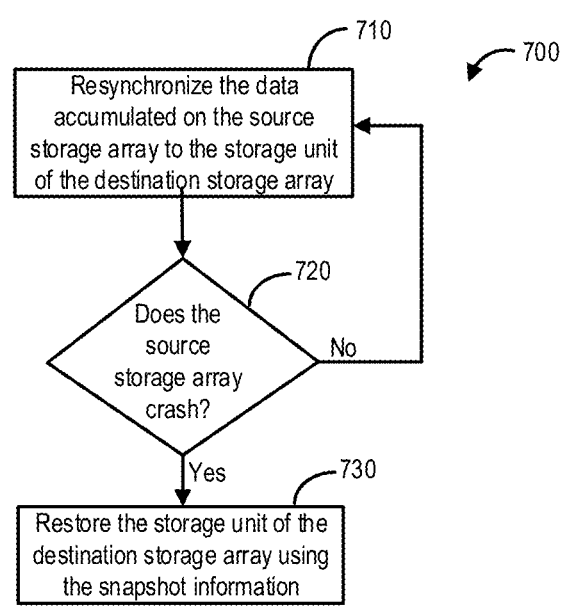
FIG. 7 illustrates a flowchart of a method for data synchronization according to a further embodiment of the present disclosure.

FIG. 7 illustrates a flowchart of a method 700 for data synchronization according to a further embodiment of the present disclosure. The method 700 is provided for describing a procedure of using a snapshot according to embodiments of the present disclosure. As mentioned above with reference to FIG. 4, the source storage array may crash for various reasons during the resynchronization for the data accumulated on the source storage array, but in force failover, if the snapshot only including the partly synchronized data is used to restore the storage unit in the destination storage array, the entire file system is not available and the disaster recovery thus cannot be implemented. In this circumstance, the storage unit in the destination storage array can be restored with the aid of the snapshot created at block 550.

As shown in FIG. 7, at block 710, the data accumulated on the source storage array is resynchronized to the storage unit of the destination storage array. The procedure at block 710 is similar to the procedure at block 560, which is omitted herein.

At block 720, it is determined (or ascertained) whether the source storage array crashes. If the source storage array does not crash, it returns to block 710 to continue to resynchronize the accumulated data. If the source storage array crashes, it proceeds to block 730.

Figure 8:
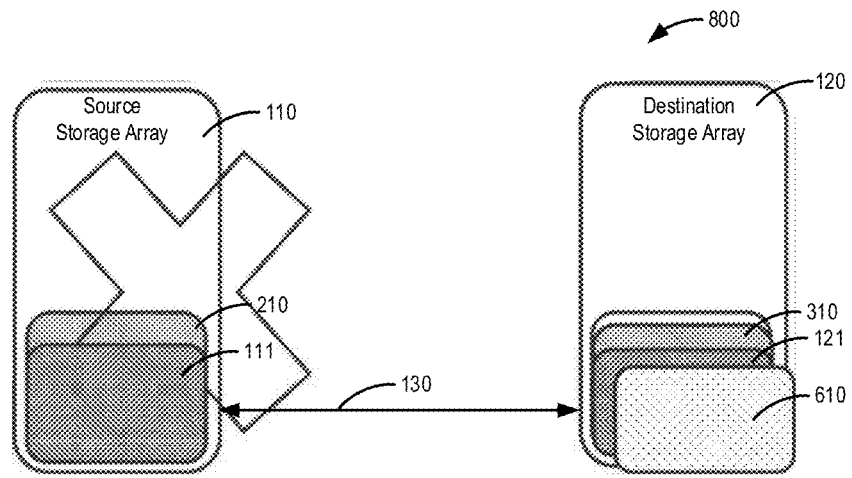
FIG. 8 illustrates a diagram of utilizing a snapshot according to embodiments of the present disclosure.

At block 730, the snapshot created at block 550 is used to restore the storage unit of the destination storage array, so as to implement disaster recovery for the crash of the source storage array. More details will be provided below with reference to FIG. 8. FIG. 8 illustrates a diagram 800 of using a snapshot according to embodiments of the present disclosure. The preceding example is still employed herein, and as shown in FIG. 8, the source storage array 110 crashes after the data 210 accumulated on the source storage array 110 are partly resynchronized to the destination storage array 120 (the partly synchronized data are shown by 310). At this time, the partly synchronized data 310 are discarded, and the snapshot 610 created just prior to the resynchronization is used to restore the storage unit 121 to the state before the resynchronization. As such, in the case that the source storage array 110 crashes, the storage unit 121 of the destination storage array 120 is still available, thereby ensuring relatively normal use by the user and improving the user experience.

According to embodiments of the present disclosure, the snapshot (for example, the snapshot 610 in FIG. 6) is deleted if not needed, and the storage space thus is saved remarkably. According to one embodiment of the present disclosure, the snapshot can be deleted in response to a predetermined period is elapsed after the data accumulated in the source storage array is resynchronized to the storage unit of the storage array (for example, as described with reference to blocks 560 and 710). According to embodiments of the present disclosure, the snapshot can be deleted when a MirrorView session becomes stable again after synchronization of the accumulated data is completed. For example, the predetermined period can be about 5 minutes since the synchronization. It should be appreciated that the embodiments of the present disclosure are not limited in this aspect, and the predetermined period can be a suitable period arbitrarily set.

According to another embodiment, the snapshot can be deleted in response to the synchronous replication being disabled. According to embodiments of the present disclosure, the snapshot can be deleted if the synchronous replication function is disabled, for example, if the MirrorView session is deleted. Consequently, the storage space for the snapshot can be saved remarkably.

According to a further embodiment of the present disclosure, the snapshot can be deleted in response to the snapshot being used to restore the storage unit in the destination storage array. That is, the snapshot is deleted after it has been used (for example, after the procedure at block 730 in FIG. 7). Hence, the storage space for the snapshot can be saved greatly likewise.

According to the embodiments as described with reference to FIGS. 1-8, an improved solution for data synchronization can be implemented, in which a snapshot is created for a respective storage unit of a destination storage array just prior to resynchronizing data accumulated on a source storage array to the destination storage array, for use in force failover. In this way, availability of the storage unit of the destination storage array is ensured, and thus the disaster recovery is ensured and user experience is improved. Moreover, since a snapshot is created only when needed and deleted if not needed, the storage space for the snapshot can be saved considerably.

Figure 9:
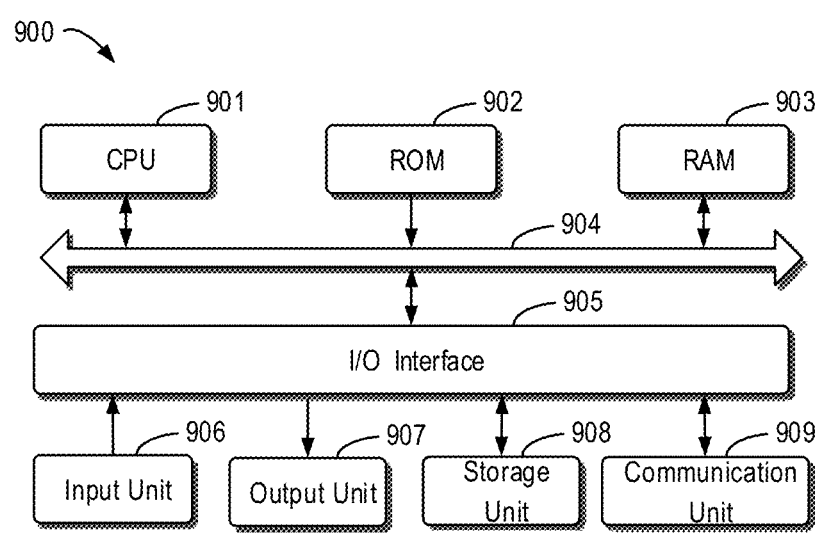
FIG. 9 illustrates a diagram of an electronic device for implementing embodiments of the present disclosure.

FIG. 9 illustrates a diagram of an example device 900 for implementing embodiments of the present disclosure. The device 900 can implement the method as described with reference to FIGS. 1-8. As shown therein, the device 900 includes a central processing unit (CPU) 901 which performs various appropriate acts and processing, based on a computer program instruction stored in a read-only memory (ROM) 902 or a computer program instruction loaded from a storage unit 908 to a random access memory (RAM) 903. The RAM 903 stores therein various programs and data required for operations of the device 900. The CPU 901, the ROM 902 and the RAM 903 are connected via a bus 904 with one another. An input/output (I/O) interface 905 is also connected to the bus 904.

The following components in the device 900 are connected to the I/O interface 905: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the device 900 to exchange information/data with other apparatus through a computer network such as the Internet and/or various kinds of telecommunications networks.

Various processes and processing described above, e.g., the method 500 and/or 700, may be executed by the processing unit 901. For example, in some embodiments, the method 500 and/or 700 may be implemented as a computer software program that is tangibly included in a machine readable medium, e.g., the storage unit 908. In some embodiments, part or all of the computer programs may be loaded and/or mounted onto the device 900 via ROM 902 and/or communication unit 909. When the computer program is loaded to the RAM 903 and executed by the CPU 901, one or more steps of the method 500 and/or 700 as described above may be executed. Alternatively, the CPU 901 can be configured to perform the method 500 and/or 700 in any other appropriate manner (for example, by means of firmware) in other embodiments.

Program code for carrying out methods according to the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method for data synchronization, comprising:

in response to writing of first data to a source storage array, determining whether a transmission link between the source storage array and a destination storage array is disconnected, a portion of the first data being synchronized to a storage unit in the destination storage array, the storage unit being associated with second data previously synchronized from the source storage array to the destination storage array;

in response to determining that the transmission link is disconnected, accumulating in the source storage array the first data written to the source storage array;

in response to detecting that the transmission link is recovered but prior to performing a resynchronization of the first data to the storage unit in the destination storage array, discarding the portion of the first data synchronized to the storage unit, and creating a snapshot for the storage unit using the second data previously synchronized from the source storage array to the destination storage array;

in response to creating the snapshot for the storage unit, performing a resynchronization of the first data to the storage unit in the destination storage array; and in response to crashing of the source storage array during the performing of the resynchronization of the first data to the storage unit in the destination storage array, restoring the storage unit in the destination storage array using the snapshot.

2. The method of claim 1, further comprising:
in response to a predetermined period being elapsed after the performing of the resynchronization of the first data to the storage unit, deleting the snapshot.

3. The method of claim 1, further comprising:
in response to the performing of the resynchronization of the first data to the storage unit being completed, deleting the snapshot.

4. The method of claim 1, further comprising:
in response to the snapshot being used to restore the storage unit in the destination storage array, deleting the snapshot.

5. The method of claim 1, wherein the storage unit corresponds to at least one of the following: a particular storage object or a logic unit number (LUN).

6. An electronic device, comprising:
a processing unit; and
a memory storing instructions which, when executed by the processing unit, cause the electronic device to:
in response to writing of first data to a source storage array, determine whether a transmission link between the source storage array and a destination storage array is disconnected, a portion of the first data being synchronized to a storage unit in the destination storage array, the storage unit being associated with second data previously synchronized from the source storage array to the destination storage array;
in response to determining that the transmission link is disconnected, accumulate in the source storage array the first data written to the source storage array;
in response to detecting that the transmission link is recovered but prior to performing a resynchronization of the first data to the storage unit in the destination storage array, discard the portion of the first data synchronized to the storage unit, and create a snapshot for the storage unit using the second data previously synchronized from the source storage array to the destination storage array;
in response to creating the snapshot for the storage unit, performing a resynchronization of the first data to the storage unit in the destination storage array; and
in response to crashing of the source storage array during the performing of the resynchronization of the first data to the storage unit in the destination storage array, restore the storage unit in the destination storage array using the snapshot.

7. The electronic device of claim 6, wherein the memory further stores instructions which, when executed by the processing unit, cause the electronic device to:
in response to a predetermined time period being elapsed after the performing of the resynchronization of the first data to the storage unit, delete the snapshot.

8. The electronic device of claim 6, wherein the memory further stores instructions which, when executed by the processing unit, cause the electronic device to:
in response to the performing of the resynchronization of the first data to the storage unit being completed, delete the snapshot.

9. The electronic device of claim 6, wherein the memory further stores instructions which, when executed by the processing unit, cause the electronic device to:
in response to the snapshot being used to restore the storage unit in the destination storage array, delete the snapshot.

10. The electronic device of claim 6, wherein the storage unit corresponds to at least one of the following: a particular storage object or logic unit number (LUN).

11. A computer program product having a non-transitory computer readable medium which stores a set of instructions for data synchronization; the set of instructions, when carried out by computerized circuitry, causing the computerized circuitry to perform a method of:
in response to writing of first data to a source storage array, determining whether a transmission link between the source storage array and a destination storage array is disconnected, a portion of the first data being synchronized to a storage unit in the destination storage array, the storage unit being associated with second data previously synchronized from the source storage array to the destination storage array;
in response to determining that the transmission link is disconnected, accumulating in the source storage array the first data written to the source storage array;
in response to detecting that the transmission link is recovered but prior to performing a resynchronization of the first data to the storage unit in the destination storage array, discarding the portion of the first data synchronized to the storage unit and creating a snapshot for the storage unit using the second data previously synchronized from the source storage array to the destination storage array;
in response to creating the snapshot for the storage unit, performing a resynchronization of the first data to the storage unit in the destination storage array; and
in response to crashing of the source storage array during the performing of the resynchronization of the first data to the storage unit in the destination storage array, restoring the storage unit in the destination storage array using the snapshot.

* * * * *